Figure 1:
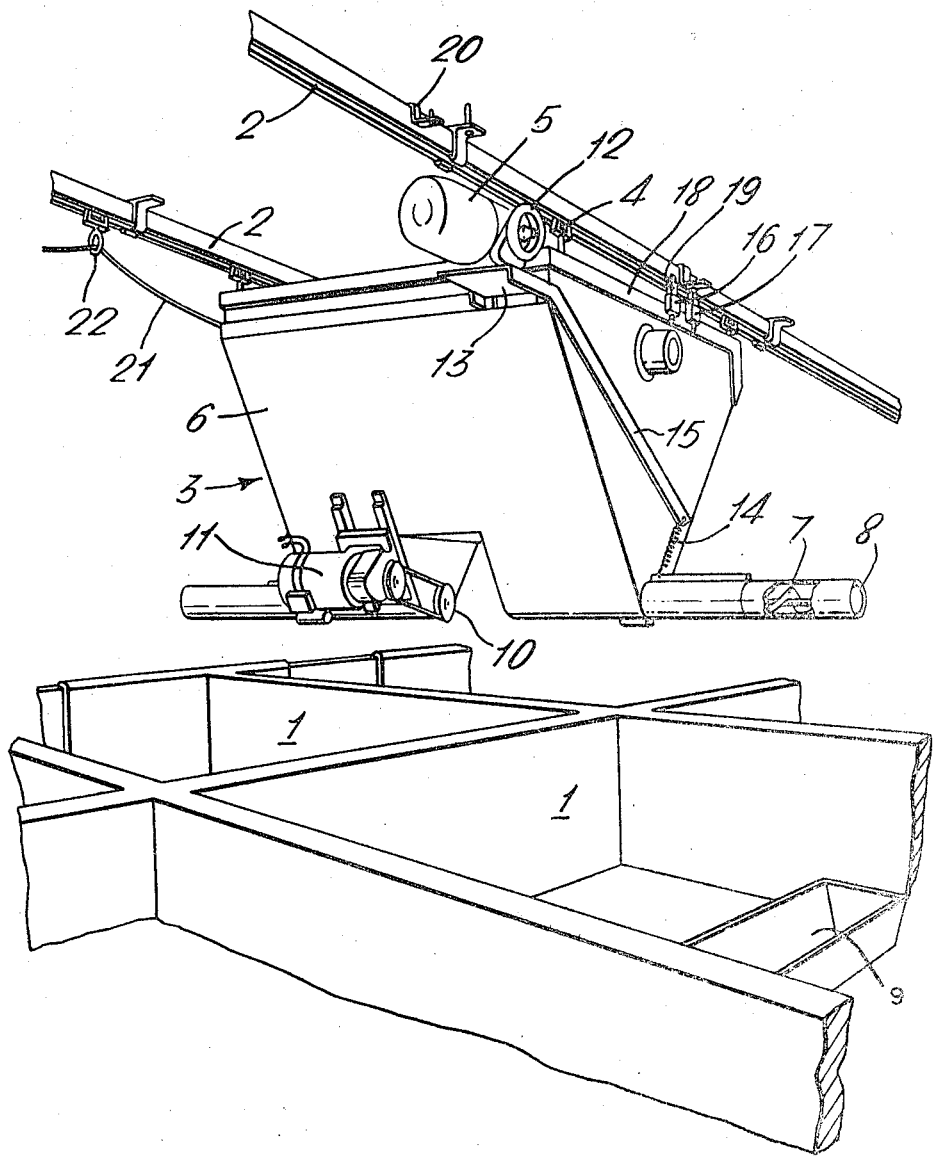

United States Patent

[11] 3,550,812

| [72] | Inventor | Richard J. A. Brown |
| | | Astwood Hill Farm, Astwood Bank, |
| | | Redditch, England |
| [21] | Appl. No. | 657,206 |
| [22] | Filed | July 31, 1967 |
| [45] | Patented | Dec. 29, 1970 |

[54] FEEDERS FOR LIVESTOCK
3 Claims, 4 Drawing Figs.

[52] U.S. Cl. .................................................. 222/70,
222/160; 119/51.11
[51] Int. Cl. ....................................................... A01k 5/02,
G04c 23/19
[50] Field of Search ............................................. 222/70,
160, 178; 119/52.2, 51.11; 141/232

[56] References Cited
UNITED STATES PATENTS

| 1,476,134 | 12/1923 | Beardsley et al. | 222/160 |
| 2,601,057 | 6/1952 | Roberts et al. | 119/52.2UX |
| 2,685,863 | 8/1954 | Martin | 119/52.2UX |
| 2,786,448 | 3/1957 | McMaster | 119/52.2UX |
| 2,791,200 | 5/1957 | Palmer | 119/52.2UX |
| 2,797,663 | 7/1957 | Bailey | 119/52.2UX |
| 3,184,109 | 5/1965 | Brackett | 222/333X |
| 2,798,643 | 7/1957 | Arnett et al. | 222/333X |
| 2,961,126 | 11/1960 | Craig | 222/333X |
| 3,129,851 | 4/1964 | Seymour et al. | 222/333X |

FOREIGN PATENTS

| 1,363,059 | 4/1964 | France | 119/52.2 |

Primary Examiner—Robert B. Reeves
Assistant Examiner—Frederick R. Handren
Attorney—Scrivener, Parker, Scrivener and Clarke

ABSTRACT: A dispenser for granular animal feeds comprises a movable hopper with a horizontal electrically driven auger discharging device at its lower end and the auger motor is run for a prearranged period opposite each animal pen, either by means of an electric manually settable timer or by driving the hopper at a steady speed past the pens and using adjustable stationary strikers in its path to start and stop the motor.

FEEDERS FOR LIVESTOCK

This invention relates to feeders for livestock and has for its object to provide improved apparatus of the type wherein the replenishment of livestock feeding troughs is accomplished automatically.

It is known to provide automatic control of the supply of feed to livestock such as pigs in which a time clock initiates the discharge of predetermined quantities of feed into the pens at regular prearranged intervals.

It is also known to provide livestock feeders of a kind which comprise mobile feed carrying hoppers, movable along tracks over or adjacent to a row or rows of livestock pens, such feeders incorporating different forms of discharge means. For example in one arrangement there were means for continuously circulating the feed within the apparatus and on the opening of a gate or movement of a diverter plate the feed was delivered to the feeding troughs, but when the gate was shut or the diverter plate was in a no-delivery position the feed recycled within the apparatus until delivery was again called for.

It can be seen, therefore, that, in feeders of the kind herein described, previous to the present invention, such discharge arrangements have been inherently inflexible or substantially inaccurate and the mechanical operation of gates or flaps is unsatisfactory and liable to lead to jamming or other troubles over a period of use. It is an object of the present invention to provide a feeder having a high degree of accuracy in the quantity delivered, and also one in which the quantity is easily regulated by the user.

According to the present invention I now propose apparatus for feeding livestock comprising a mobile feed-carrying hopper movable along a track over or adjacent to a row of livestock pens and electrically driven, constant speed, positive discharge means for discharging feed from the hopper into the individual pens in turn, the discharge means being switched on and off by timing means which are adjustable to suit the individual pens.

In this way the quantity of food delivered to each pen is controlled by the duration of time for which the discharge means run during the period in which the hopper is opposite that pen. Preferably, according to a further feature of the invention, the discharge means comprise an auger feeder driven by an electric motor.

The hopper could be movable under power at a constant speed and the timing means could be in the form of adjustably spaced strikers associated with each pen to switch the auger or other discharge means on and off or, in a simpler alternative, the hopper could be movable manually and the timing means could be a manually settable timer that switches the auger on for a predetermined period, and the user sets it appropriately for each pen as he reaches it.

In a further possibility the hopper could be movable under power and the discharge means could be arranged to be connected for control purposes to each of several timers in turn.

Figure 2:
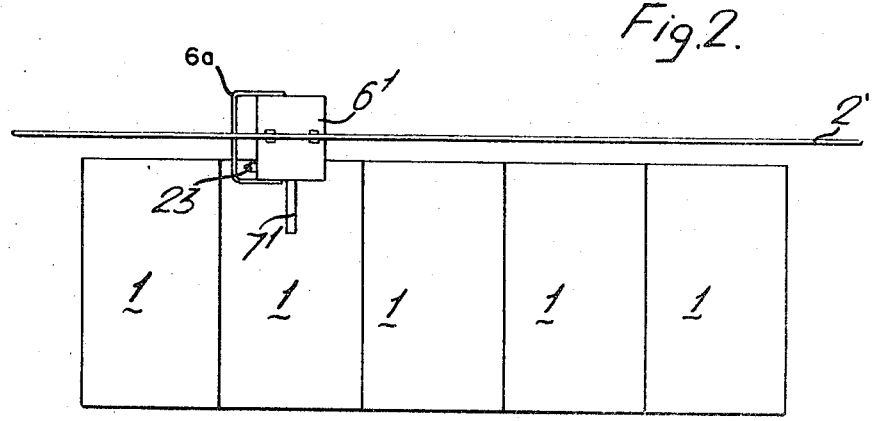
Figure 3:
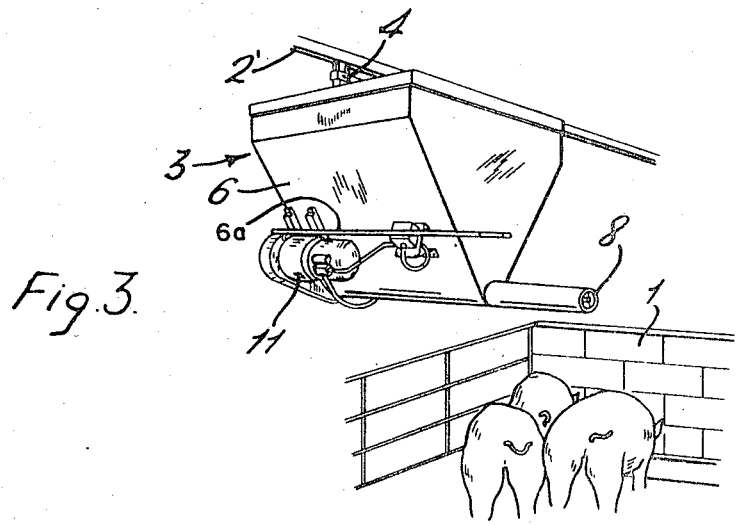
Figure 4:
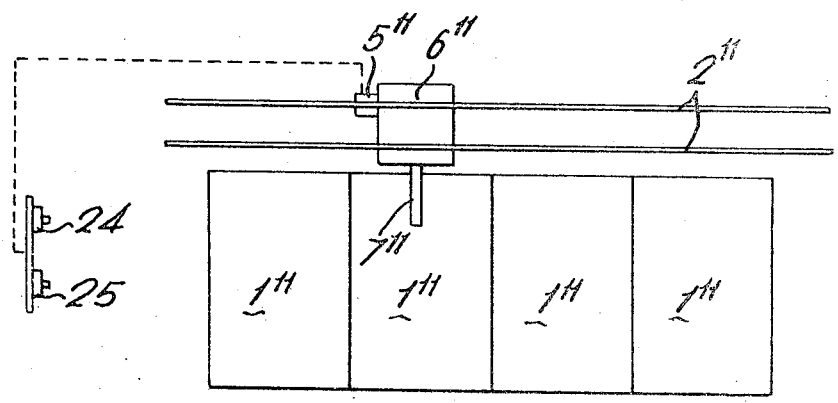

The invention will now be further described by way of example with reference to the accompanying drawings, in which:

FIG. 1 shows a perspective view of a fully automatic layout;
FIG. 2 shows diagrammatically a plan view of a simpler manual layout;
FIG. 3 is a perspective view of the hopper of the layout of FIG. 2; and
FIG. 4 shows diagrammatically a plan view of a third possible layout.

The embodiment illustrated in FIG. 1 is fully automatic and is intended primarily for feeding pigs. Above a two-row layout of pig pens 1 there is suspended, by suitable known methods, a track 2 consisting of parallel lengths of rail of inverted channel section of a known kind. The feeder 3 is suspended from runners 4 on the track and is movable along the track between two end positions, one of which constitutes the rest position where the feeder rests between feeding cycles under a bulk bin from which it is supplied with feed by an auger, while at the other end position switching means are provided for reversing the direction of running of a tractive motor 5 to return the feeder to the rest position at the end of a feeding cycle.

Instead of being suspended from overhead rails, the feeder 3 could be supported on rails running along the tops of the pens, or even on rails at ground level if desired.

The feeder comprises a hopper 6, of a generally wedge shape in the base of which two augers 7 are incorporated, the delivery tubes 8 of which extend, one each side, from the walls of the hopper for a length such that the feed falls from the ends of the delivery tubes into the feeding troughs 9 in the pens. Alternatively the feed may simply be allowed to fall onto the floors of the pens. The base of the hopper is modified at the center to allow clearance for guarded pulleys 10 for the augers, driven through Vee belts from motors, of which one is visible at 11, adjustably mounted on the wall of the hopper. The tractive motor 5 drives a rubber-covered wheel 12 which is in frictional engagement with the underside of one of the rails comprising the track. The motor is mounted on a plate 13 which is pivoted at one side so that spring means 14 at the end of a torque arm 15 attached to the motor mounting plate urge the drive wheel into engagement with the rail. The tractive motor is of a constant speed type so that on commencement of a feeding cycle the feeder proceeds at a constant speed along the track. The auger drive motors are also of a constant speed type and their operation is controlled by associated limit switches 16 and 17, of a known type, disposed on plates 18 mounted on each side of the hopper such that the roller arms 19 of the limit switches may coact with tripping means such as strikers 20 adjustably attached to the rails.

The two augers operate independently of each other as their respective drive and control means are duplicated.

An electric power supply is fed to the movable feeder via a catenary cable 21 supported from one of the rails on runners 22.

In operation the feed cycle may be started by manually operating a start button or in a completely automatic feeding layout a process timer of a known type may be incorporated. On initiation of the cycle, the bulk bin replenishes the hopper of the feeder by an auger or other suitable means until sensing means, such as a pressure switch at the outlet of the auger, indicates that the hopper has been filled. The tractive motor 5 is then started and drives the feeder along the track at a constant speed. When the start switch 16 is operated by a suitably positioned striker 20 opposite the first of the pens reached, the associated auger discharges feed from its delivery tube into the feed trough at a constant rate and as the movement of the feeder is at a constant speed the feed is uniformly distributed along the trough or along the floor of the pen. When the stop limit switch 17 encounters the second striker associated with that pen the auger ceases to discharge feed. The hopper continues to travel past the pens and then the feed-discharging auger is started again when the start switch encounters the first striker associated with the second pen and is stopped by the second striker associated with that pen. The process is repeated at each pen in each of the two rows independently. When the hopper reaches the end of the track it is automatically reversed and returns to its starting position, without delivering any further feed, and awaits a further call, either manual or from a time clock.

It will be seen that as the feeder is moving at a known constant speed and as the discharge rate from the augers is also constant and known, the amount discharged at each pen will be dependent upon the distance between the two strikers associated with that pen. Thus an accurate variable and even distribution of feed may be attained by suitable positioning of the limit switch strikers. The user adjusts the spacing of the strikers according to the number and size of the pigs in the pen, and a scale can be marked on the track, calibrated for example in pounds weight of feed, to make this easy.

If there are no pigs at all in a given pen the strikers are removed from the track altogether and no feed is discharged into that pen.

In an alternative arrangement of lower capital cost, illustrated in FIGS. 2 and 3, I omit the power driving means for the hopper but retain the electrically driven augers. The hopper could still be suspended from an overhead track or it could be mounted on a track at or near ground level or on rails running along the tops of the pens. In the preferred version a hopper 6' is suspended from a single overhead track 2'. It is pushed manually past the pens by the user with the aid of a conveniently placed handle 6a. The strikers are omitted and instead the electric motor driving the auger 7' is controlled by a manually settable electrically driven timer 23 which is conveniently placed for setting by the user and which, when started, switches the auger motor on and then switches it off again after a period of time determined by its setting. As the hopper reaches each pen in turn the user sets the timer to cause the discharge into the trough of that pen of the quantity of feed required to suit the number of animals in that pen. The timer 23 can be calibrated in units of weight of food, or even in numbers of animals where the conditions allow it.

It will be appreciated that even this simplified version enables the livestock breeder to do away with tedious and often inaccurate individual weighing operations, with their attendant possibilities of wastage and errors, yet the method is flexible in operation, in that the user can allow on the spot for changes in the number of animals in the individual pens, and furthermore no resetting operations are required, as in the more sophisticated arrangement described earlier, beyond setting of the timer itself.

In the version illustrated in FIGS. 2 and 3 there is only one auger. However, in practice it is usually more convenient to have two augers discharging in opposite directions and to dispose the track along a path running between two lines of pens. Where there is only a single auger, the hopper could be suspended from the track (which could be a single rail instead of the two rails illustrated) in a manner which allows it to be turned through 180° about a vertical axis, so that the user pushes the hopper along the track, supplying feed to a row of pens on one side of the track and then when he reaches the end of the track he turns the hopper around and pushes it back down the track, supplying the row of pens on the other side.

An advantage of using a single rail instead of the two-rail track is that it makes it much easier to arrange for track to follow a curved path if necessary.

In the embodiment shown in FIG. 4 a hopper 6" is supported on rails 2" to move past a line of pens 1" and discharge the feed into them by means of an electrically driven auger 7" and in the same way as the versions of FIGS. 1, 2 and 3. The hopper is propelled along the rails by a motor 5" like the version of FIG. 1. But the motor of the auger 7" is controlled by a set of several manually settable timers 24 mounted on a control panel 25 at a conveniently accessible fixed position. The number of timers 24 is equal to the number of pens 1".

When the user starts the equipment, the hopper 6" proceeds from its starting point at one end of the rails 2" until it is aligned with the first pen, whereupon the motor 5" is switched off and the motor of the auger 7" is connected to the first timer 24. The auger runs for a period determined by the setting of this timer and is then switched off and the motor 5" is switched on again to cause the hopper to proceed to the next pen where it is halted and the process is repeated, controlled this time by the second timer. The cycle continues until the hopper reaches the end of the line of pens and then automatically returns to its starting point. Thus each pen has received a quantity of feed determined by the setting of its associated individual timer.

This version of FIG. 4 is suitable for feeding cattle when they are brought in for milking and the pens 1" would in practice be cattle stalls. Where several successive batches of cattle are brought to the stalls in turn the user would reset the timers 24 on the control panel 25 between batches so that every cow receives a quantity of feed exactly matched to her needs.

An important advantage of the high accuracy in the quantity of feed delivered by the use of times augers is the economy that can be achieved in feedstuffs, as there is no need to make allowance for errors, and furthermore, in the case of pigs, it is possible to maintain a higher conversion ratio and better quality of product than is possible with less accurate feeding methods.

The pulley 10 or the pulley on the auger driving motor 11 may be of the kind in which the axial spacing of the flanges is adjustable, thereby adjusting the effective diameter of the pulley and allowing fine control of the delivery of the auger to match the calibration of the timer or timers (in the versions of (FIGS. 2, 3 and 4) or of the markings on the track for the strikers 20 (in the version illustrated in FIG. 1).

I claim:

1. Apparatus for feeding livestock comprising a hopper guided for movement along a track past a line of livestock pens, constant speed, electrically driven, feed-discharging means on said hopper and variable timing means controlling the duration of running of said feed-discharging means, said timing means comprising pairs of strikers associated with each pen and electric switch means associated with said hopper, said switch means being disposed to be closed and opened in turn by engagement with said strikers in turn on movement of said hopper past said line of pens, said pairs of strikers being of adjustable spacing apart, and constant speed driving means causing said movement of said hopper, said driving means comprising a platform pivotally connected to said hopper, an electric motor mounted on said platform, a wheel driven by said motor and coated with friction material and mounted on said platform, and spring means urging said platform about its pivotal connection with said hopper such as to cause said wheel to bear resiliently against said track.

2. Apparatus for feeding livestock comprising a hopper guided for movement along a track past a line of livestock pens, a first constant speed, electric motor drivingly connected to said hopper to move said hopper at a constant speed along said track, a tubular discharge member projecting substantially horizontally from the lower region of said hopper and projecting over said line of pens, a helical auger dispensing device rotatable in said discharge member, a second constant speed, electric motor drivingly connected to said auger dispensing device, electric switch means controlling said second motor, and pairs of manually adjustable striker means associated with each of said pens and settable an adjustable distance apart in the direction of travel of said hopper, said pairs of striker means being positioned to be engaged by said switch means during travel of said hopper along said track to cause running of said second motor for an adjustable duration of time, one of the strikers of each said pair being adapted to close said switch means and the other to open said switch means.

3. Apparatus for feeding livestock comprising a hopper guided for movement along a track past a line of livestock pens, a tubular discharge member projecting substantially horizontally from the lower region of said hopper and projecting over said line of pens, a helical auger dispensing device rotatable in said discharge member, a constant speed, electric motor drivingly connected to said auger dispensing device, electric switch means controlling said motor, and a plurality of individual, independently manually settable timers, each capable of being connected in turn to said switch means to cause running of said motor for an adjustable duration of time, and each timer being associated with one of said pens.